Dec. 6, 1938.   J. M. ROSS   2,138,885
REFRIGERATED INSULATION
Filed April 20, 1936
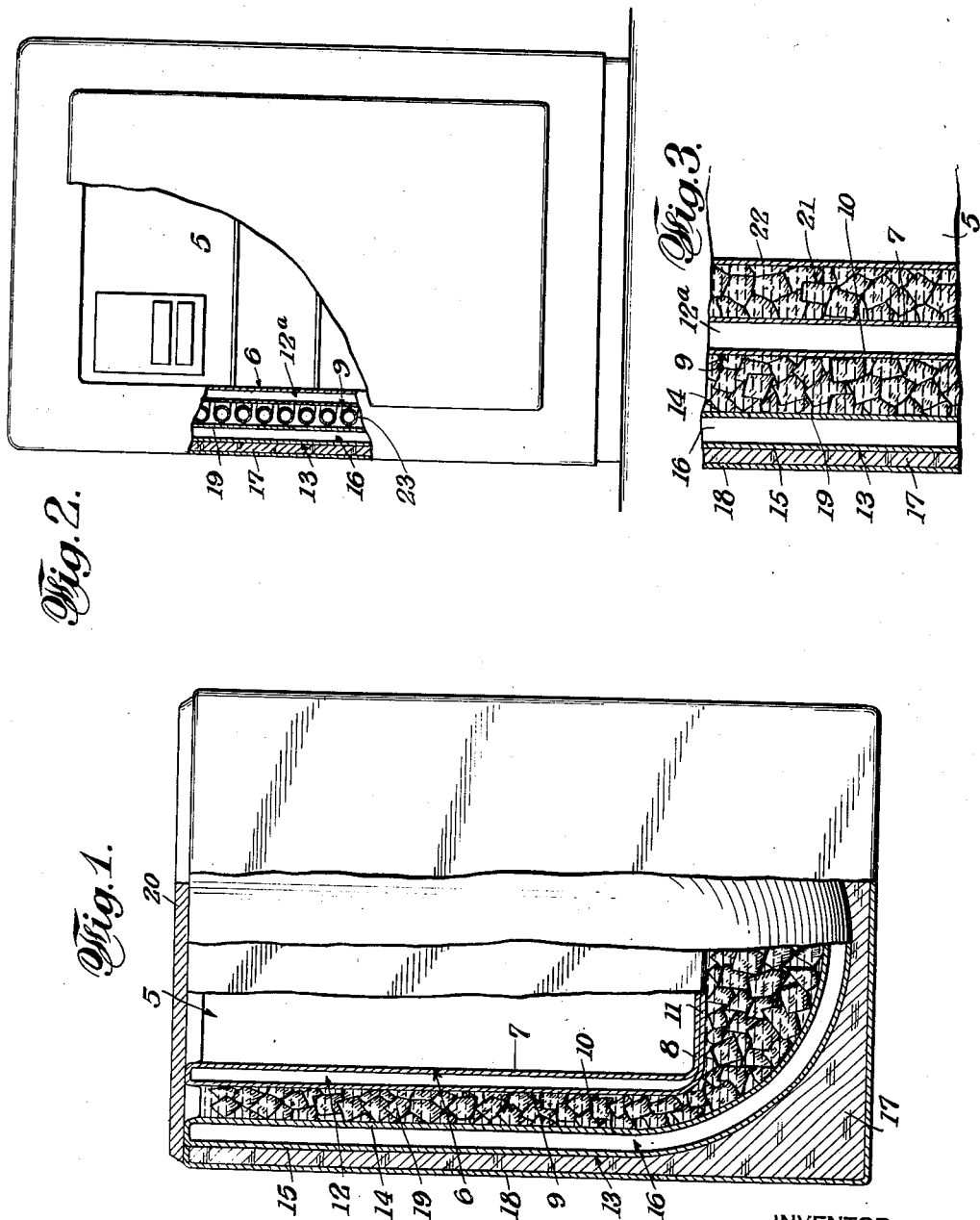

Patented Dec. 6, 1938

2,138,885

UNITED STATES PATENT OFFICE 2,138,885

REFRIGERATED INSULATION

Joseph M. Ross, Bellaire, N. Y.

Application April 20, 1936, Serial No. 75,371

4 Claims. (Cl. 62—87)

This invention may be designated as refrigerated insulation and relates to means for efficiently maintaining a refrigerated area, such as a food chamber and the like, within a desired temperature range.

More specifically the invention deals with refrigerator insulation which I designate as "refrigerated insulation" since it is contemplated to actually provide an insulation which, in part, comprises a refrigerant.

The major object of the invention, therefore, is to provide a refrigerator insulation which includes a refrigerant.

Another object is to provide a refrigerated insulation which comprises a combination of heat insulating means and a refrigerant.

A further object is to provide a refrigerated insulation which comprises a combination of heat insulating means and a refrigerant, the heat insulating means comprising either a combination of vacuum and solid or granular insulation, or, a combination of vacuum, dead air, and solid or granular insulation.

The invention, as hereinafter described and as shown in the accompanying drawing in several of its embodiments, may be employed in many ways. The particular combinations of insulation and refrigerants being shown rather as exemplary than limiting.

In the drawing:

Fig. 1 is a partial elevational, partial sectional view of a refrigerator incorporating features of the invention.

Fig. 2 is a similar view of another form of refrigerator showing an alternate form of refrigerated insulation.

Fig. 3 is a fragmentary detail sectional view of still another form of refrigerated insulation.

With particular reference to Figure 1, the chamber 5 for the storage of food, liquids and the like, is formed, as shown, as a rectangular shell 6 comprising walls 7 and bottom 8. A similar shell 9, comprising walls 10 and bottom 11 is arranged outside the shell 6 so the bottoms 8 and 11 are preferably in contact, and the several respective walls 7 and 10 are in spaced relation to provide a chamber 12 in which the air is confined and sealed against circulation.

In spaced relation with the shell 9, there is provided a flask 13, preferably round in plan section, said flask including spaced walls 14 and 15 having between them a vacuum 16.

As shown, the flask 13 is surrounded by an insulating material such as cork, felt and the like 17, and finally there is provided an outer shell or casing 18.

In the space between the shell 9 and the vacuum flask 13, there is placed a refrigerant such as the cracked ice 19. The whole assembly as above described may be provided with a lid cover such as shown at 20.

The shells 6 and 9 are preferably made of metal while the shell 18 and flask 13, although preferably made of metal, may be made of other suitable materials such as wood, glass, or a phenolic condensation product.

In use, the refrigerator shown in Figure 1, is filled with the refrigerant 19 which chills the shell 9. This shell transmits its low temperature to the shell 6 by means of direct conduction between the bottoms 11 and 8, and the chilling of the dead air in the chamber 12, the low temperature of which is conducted to the walls 7. In this manner, the chamber 5 is provided with a refrigerating temperature.

The melting rate of the refrigerant 19 is maintained relatively low by the effective insulation formed by the vacuum flask 13 and the insulation 17. This melting rate is further reduced because of the slow heat exchange between the refrigerant 19 and the chamber 5 since the only direct communication between them is at the bottoms 8 and 11.

Because of the direct contact between the bottom walls 8 and 11, the bottom of the food chamber, being most adjacent these walls, is at the lowest temperature of said food chamber and since most of the cold is being supplied from beneath, there is thus caused a minimum of air circulation in the food chamber. The phenomenon is directly opposite to that which occurs in the ordinary type of refrigerator, since these depend on circulation of the air in the food chamber for whatever efficiency they may have.

The temperature in the chamber 5 is maintained at a low point even after the refrigerant 19 is entirely melted since the resultant water is effectively insulated against outside temperatures by the same means which cause the slow melting rate of the refrigerant.

In the form of the invention shown in Figure 2, a mechanical or similar type of refrigerator is shown, the walls of which may be insulated as previously described. However, in this instance the shells 6 and 9 form a vacuum flask 12ª similar to the flask 13.

As shown in this form of the invention, the refrigerant between the flask 13 and the shell 9, may be replaced by tubes or coils 23 connected with the mechanism of the refrigerator. These tubes or coils may become frosted over in the normal course of operation and this frosting then serves, as heretofore described, as the refrigerated insulation.

If desired, as seen in Figure 3, another refrigerant chamber 21 may be placed within the vacuum flask 12a, the chamber 5 hence being provided with a wall 22.

As can be seen from the foregoing several forms of the invention, effective means have been provided for first reducing the melting rate of the refrigerant and then for reducing the temperature rise of the resultant water. While several embodiments have been shown, it is apparent that other similar constructions may be utilized for the same purpose, hence the scope of the invention as hereafter claimed should rather be based on the prior art than on the present specific disclosure.

I claim:

1. A refrigerator comprising an outer casing, a lining of insulation within the casing, a vacuum chamber within the lining, a double-walled metal container within the vacuum chamber and spaced therefrom, the double walls of the sides being spaced apart to form an insulating chamber therearound, and the double walls of the bottom of said container being in intimate surface contact, a storage chamber within the container, the vacuum chamber and the double-walled container being arranged to form a space to receive a refrigerating medium which is presented in heat transfer relation to the storage chamber.

2. A refrigerator comprising a metal shell having bottom and sides, a second metal shell outside the first shell with the bottoms of both shells in intimate surface contact but with their respective sides in spaced relation to provide a circumambient insulating chamber, an annulus joining and sealed to the top edges of said shells, a flask surrounding the outer shell and in spaced relation from all of the walls thereof, said flask itself being double-walled, the walls of which are spaced apart and said space being substantially evacuated, said flask being wholly surrounded by an insulating material confined within an outer casing, and a refrigerating medium in the space between the outer shell and the flask and in heat transfer relation to the outer shell.

3. A refrigerator comprising an outer casing, a lining of insulation within the casing, a vacuum chamber within the lining, a container within the vacuum chamber, the sides only of said container having spaced double walls to constitute another insulating chamber, and a storage chamber within the container, the vacuum chamber and the container being so arranged as to form a space between them to receive a refrigerating medium and to present said medium in heat transfer relation to said storage chamber.

4. A refrigerator comprising an outer casing, a lining of insulation within the casing, a vacuum chamber within the lining, a second vacuum chamber within the first-mentioned vacuum chamber, and a storage chamber within the second vacuum chamber, the two vacuum chambers being arranged to form a space to receive a refrigerating medium and to present said medium in heat transfer relation to the storage chamber.

JOSEPH M. ROSS.